Jan. 13, 1931.  A. H. WEIS  1,789,029
RADIO INDICATOR
Filed Nov. 1, 1929

INVENTOR.
BY Albert H. Weis
ATTORNEY

Patented Jan. 13, 1931

1,789,029

UNITED STATES PATENT OFFICE

ALBERT H. WEIS, OF NYACK, NEW YORK

RADIO INDICATOR

Application filed November 1, 1929. Serial No. 403,944.

This invention relates to station indicators or finders for radio receiving sets, the object of the invention being to provide a simple, inexpensive and easily applied station indicator or finder which may be applied by the manufacturer, or by the operator of receiving sets in use, and by means of which the operator of the set may tune in any desired station without the necessity of looking up the call letters of that station, or looking up a log to find out what the call letters of the desired station may be.

As is well known, radio receiving sets are not marked with the call letters of the broadcasting stations, but are marked with numbers indicating the wave lengths, in meters or kilocycles, of the stations and consequently it is necessary for the operator, unless he is able to remember the call letters corresponding with the different meter or kilocycle markings of the many stations, to examine a log to ascertain the call letters corresponding with the meters or kilocycles indicated on the set. In other words, if the operator desires to tune in on WJZ or WEAF, he is obliged to look up his log or a newspaper to ascertain the number of meters or kilocycles corresponding with those stations or else spend time in manipulating the dial over various stations and waiting for the announcer or caller to state what station is broadcasting in order to insure the desired station,—unless he is able to remember that WEAF is tuned in on a "Fada" set, for instance at 76 and WJZ at 61. This takes time, is a nuisance, and necessitates considerable labor; and if the log should become lost or a newspaper not be handy, by the time the operator has found the wanted station, he has missed some particular program or a part thereof that he desired to hear.

The meter or kilocycle markings on radio sets, as now manufactured, no doubt mean something to an expert who is able to remember the particular call letters corresponding to those various markings, but to the average operator they are just a means for finding the particular stations by reference to charts or logs.
The object of this invention, therefore, is the provision of a simple station indicator or finder which will obviate the necessity of referring to logs or charts to find or refind a particular station and which may be used in connection with receiving sets having the usual meter or kilocycle markings or without such indicia and by means of which the same station may always be found without the necessity of referring to any memoranda to ascertain the call letters corresponding with the meter or kilocycle markings on a receiving set, and thus obviate the necessity of the operator carrying in his mind the meter or kilocycle markings of the various stations.

In short, in all radio sets as now manufactured, the wave lengths of the various stations are indicated in meters or kilocycles and these are brought before the eye of the operator on the turning of the tuning dial, but this means nothing to him unless he is able to recollect with what call letters those markings correspond, and if he is unable to recollect, he must look up to find out what particular meter or kilocycle reading corresponds to WJZ or WEAF, for instance, and then turn the tuning dial to bring that particular marking to view. This is all obviated by the use of this improved station indicator. For instance, if WEAF is desired, the operator merely turns the indicator to WEAF and always gets it.

In the drawings accompanying and forming a part of this specification—

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

Figure 1:
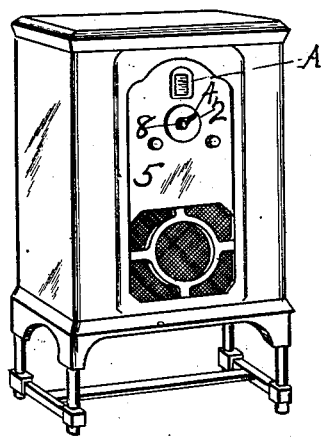
Figure 1 is a front view of a radio receiving set as commonly manufactured with the meters and kilocycles indicated thereon, but showing this improved indicator also applied thereto.
Figure 2:
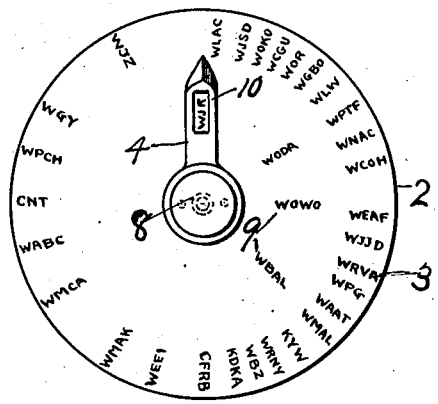
Fig. 2 is a view of this improved indicating means.
Figures 3, 5:
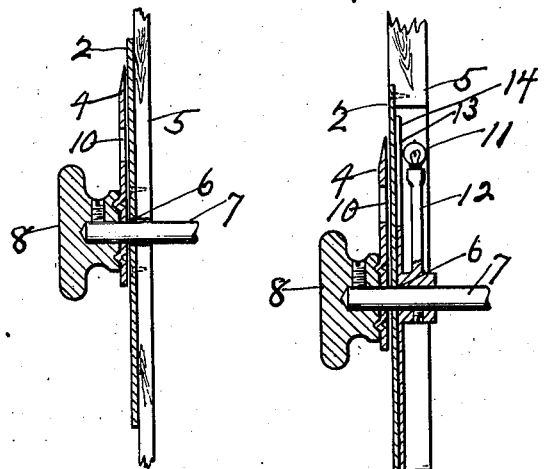
Fig. 3 is a sectional view thereof applied to the panel of a radio receiving set.
Fig. 5 is a sectional view of this improved indicating means applied to the panel of a receiving set and illustrates the manner in which an illuminating means may be used therewith.
Figure 4:
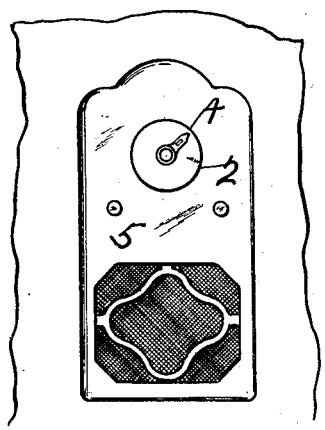
Fig. 4 is a front view of a panel of a radio receiving set without the customary markings and having this improved indicating means applied thereto.
Figure 6:
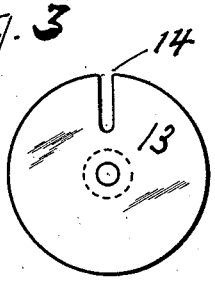
Fig. 6 is a view of an opaque disc which may be used with this improved indicator when the set is used with illuminating means.

Radio receiving sets as commonly made have, as hereinbefore stated, an indicating device marked in meters or kilocycles, as indicated at A, Fig. 1, which correspond with the call letters of the different stations; but, unless the operator can remember the call letters corresponding to the different markings, he must necessarily use a log, memorandum, or a newspaper to ascertain the particular meters or kilocycles of the various stations.

The present improvement does away with this laborious time-consuming method of finding the stations, and comprises a simple dial or disc having the station call letters directly marked thereon and a rotating pointer for application to the tuning knob, whereby any desired station may be had by the mere turning of the tuning knob.

In one preferred form thereof, this indicator or station finder comprises a dial or disc 2 having circumferentially arranged thereon, as at 3, the various call letters of the different stations, and co-operating therewith is a rotating pointer 4 adapted to be connected with the tuning knob of the receiving set for rotation therewith.

In practice the disc 2 is secured, by means of screws or brads, to the panel 5 of the receiving set and is provided with a central opening 6 for the passage of the spindle or shaft 7 of the condenser, on the outer end of which is the usual knob 8. To this knob is secured, in any suitable way, the indicating pointer 4 so that it will rotate with the knob and, therefore, with the condenser shaft. Consequently, when the dial has been applied to the set and the pointer has been turned to the desired station, that station will be tuned in. One circular band of call letters is usually sufficient for those receiving sets in which the tuning knob makes one revolution to one of the calibrated rotors. Where, however, the tuning knob makes two revolutions to one of the calibrated rotors, an inner circular band of call letters 9 is located on the disc and the pointer 4 is provided with an opening or window 10 through which the inner band of call letters may be seen. For instance, in a "Majestic" receiving set, where the tuning knob makes two revolutions to one of the calibrated rotors, the disc is provided with an outer band of call letters,— which will be indicated by the pointer on one revolution,—and an inner band of call letters,—to be indicated by the pointer on the second revolution thereof. Where the receiving sets have a two-to-one movement, dials therefor will be furnished, and where they have a three-to-one movement other dials and pointers adapted to that particular set will be furnished.

Thus in those receiving sets where it requires two or more rotations of the tuning knob to bring in all the stations, the dial is provided with several bands of station call letters, so that on the complete rotation of the dial and pointer all the stations corresponding with this one rotation of the pointer will be located in the outer band of call letters, and on the second rotation of the tuning dial all of the stations corresponding with this second rotation will be located on the inner band and observable through a window in the pointer; and if, as in some radio receiving sets, the tuning knob makes three revolutions in order to cover all the stations, then another window would be provided in the pointer to correspond with a third band of call letters located inside of the second band in a manner which will be readily understood.

In the manufacture of this improved station finder, a master dial is made to correspond with the various stations, and from this master dial any number of discs may be made, so that, when placed on the same type of receiver, it will accurately work, so long as the broadcasting stations hold to their proper wave lengths or kilocycles.

In order to apply the indicator to sets in use, all that is necessary is to remove the tuning knob 8 fit the dial over the projecting end of the tuning shaft 7, and fasten it to the panel of the receiving set. The knob is then temporarily replaced, together with the pointer, on the shaft and the shaft is rotated to bring in, for instance, Station WEAF. The indicator pointer is then rotated over Station WEAF and then the knob and pointer are permanently fastened together at this point, so that thereafter, on the rotation of the knob and pointer to the same point, WEAF will be tuned in, and by rotating it to any other call letters, that particular station will also be tuned in.

If it is desired to illuminate the dial, an electric light 11 is provided carried by an arm 12 secured to the condenser shaft 7 in the rear of the dial. This dial will preferably be made of transparent material and the light will be set in line with the pointer and rotate therewith and thus light up the call letters of the station to which the pointer is adjusted. For the purpose of preventing the illumination of the other stations, an opaque disc 13 is securely fastened to the condenser shaft back of the dial or disc having the stations marked thereon, and this prevents the illumination of the complete dial. This opaque disc has a slot 14 therein in line with the pointer and the electric light through which the light rays pass to illuminate the disc at the point indicated by the pointer while the rest of the disc is maintained in shadow, thus illuminating only the station to which the pointer is adjusted. In some instances it would not be necessary to rotate the electric light with the shaft, as the light could be in a fixed position at all times, for a certain amount of illumination would always pass through the slot in the opaque disc when this slot is rotated with the pointer and thus illuminate the particular call letters to which the pointer is adjusted,—this arrangement depending upon the brilliancy of the electric light.

Thus by the provision of a dial having the call letters properly arranged thereon according to the calibrations of the particular receiving set with which the device is to be used and the provision of a simple pointer adapted to be fixed to the tuning knob in any suitable way, I have provided a simple device which can easily be applied by the manufacturer or by the user which will always indicate the desired station and enable the user to refind it at any time without mental calculation of any kind and without the use of charts, logs, or memoranda for reference.

It is to be understood that by describing in detail herein any particular form, structure, or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. A station indicating device for radio receiving sets comprising a disc having station call letters circumferentially located thereon and a pointer, said pointer and disc being located on the tuning shaft of the set and rotatable one relatively to the other whereby the set may be tuned directly to the call letters desired, and rotatable means for illuminating the selected call letters.

2. A station indicating device for radio receiving sets comprising a disc having a plurality of parallel bands of station call letters thereon and a rotatable pointer having an opening registering with one of the bands of call letters and rotatable with the tuning shaft of the set and shiftable into position to indicate the various stations.

3. A station indicating device for radio receiving sets comprising a disc having a plurality of parallel bands of station call letters circumferentially located thereon and a pointer having an opening therein registering with one of the bands of call letters, said pointer and disc being located on the tuning shaft of the set and rotatable one relatively to the other whereby the set may be tuned directly to the call letters desired.

4. A station indicating or finding device for radio receiving sets comprising a pair of co-operating members rotatable one relatively to the other, one having a series of station call letters thereon, means for rotating one of said members, and illuminating means for the selected call letters and rotatable with the rotatable member.

5. A station indicating device for radio receiving sets comprising a fixed disc having a circumferential band of call letters thereon, a rotatable pointer rotatable with the tuning knob of the set, illuminating means located in the rear of said disc, and means located between said disc and said illuminating means for opaquing the disc except at the selected call letters.

6. A station indicating device for radio receiving sets comprising a fixed disc having a circumferential band of call letters thereon, a rotatable pointed rotatable with the tuning knob of the set, illuminating means located in the rear of said disc, and means located between said disc and said illuminating means for opaquing the disc except at the selected call letters, said opaquing means being rotatable with the pointer.

7. A station indicating device for radio receiving sets comprising a fixed disc having a circumferential band of call letters thereon, a rotatable pointer rotatable with the tuning knob of the set, illuminating means located in the rear of said disc, and means located between said disc and said illuminating means for opaquing the disc except at the selected call letters, said opaquing means being rotatable with the pointer and said illuminating means being also rotatable with the pointer.

8. A station indicating device for radio receiving sets comprising a fixed disc having a plurality of bands of station call letters thereon, a pointer rotatable with the tuning shaft of the set and located in front of said disc and provided with a window registering with one of the bands of call letters, an illuminating device in the rear of said disc, and means for opaquing all of the call letters of the disc except the selected ones.

9. A station indicating device for radio receiving sets comprising a fixed disc having a plurality of bands of station call letters thereon, a pointer rotatable with the tuning shaft of the set and located in front of said disc and provided with a window registering with one of the bands of call letters, an illuminating device in the rear of said disc, and means for opaquing all of the call letters of the disc except the selected one, said means comprising a disc having a slot and rotatable with the pointer.

Signed at Nyack, New York, this 30th day of October, 1929.

ALBERT H. WEIS.